United States Patent

Kobayashi et al.

[11] Patent Number: 5,145,037
[45] Date of Patent: Sep. 8, 1992

[54] DISK BRAKE

[75] Inventors: Kinzo Kobayashi, Kanagawa; Yoshikazu Gamoh, Yamanashi, both of Japan

[73] Assignee: Tokico Ltd., Kanagawa, Japan

[21] Appl. No.: 665,223

[22] Filed: Mar. 6, 1991

[30] Foreign Application Priority Data

Mar. 6, 1990 [JP] Japan ................. 2-22377[U]

[51] Int. Cl.5 ............................................ F16D 65/00
[52] U.S. Cl. .................................. 188/73.1; 188/250 B
[58] Field of Search ............ 188/250 B, 206 A, 73.35, 188/73.1, 71.1, 73.31

[56] References Cited

U.S. PATENT DOCUMENTS

| | | | |
|---|---|---|---|
| 4,003,451 | 1/1977 | Torok | 188/250 B X |
| 4,220,223 | 9/1980 | Rinker et al. | 188/250 B X |
| 4,485,898 | 12/1984 | Bracken et al. | 188/250 B |
| 4,705,146 | 11/1987 | Tarter | 188/73.1 |
| 4,878,564 | 11/1989 | Kondo | 188/73.31 |
| 5,025,847 | 6/1991 | Hirashita | 188/73.1 |

FOREIGN PATENT DOCUMENTS 1-33871 10/1989 Japan .

Primary Examiner—Matthew C. Graham
Assistant Examiner—Lee W. Young
Attorney, Agent, or Firm—Wenderoth, Lind & Ponack

[57] ABSTRACT

A disc brake prevents the generation of brake noise by chamfering a pair of friction pads which are disposed at both sides, respectively, of a rotating disc. Each pad includes a backing plate and a lining that is rigidly secured to the backing plate, the lining having a friction surface that is to be pressed against the disc. Both side portions of the lining extend outwardly beyond the outer side surfaces of the corresponding claw portions of a caliper in the widthwise direction. The lining is chamfered at each side portion from a position whose distance from the outer side surface of the corresponding claw portion is in the range of from one third to one fourth of the width of the claw portion.

4 Claims, 3 Drawing Sheets

ID
DISK BRAKE

BACKGROUND OF THE INVENTION

1. Field of the Invention

The present invention relates to a disc brake and, more particularly, to a disc brake which is designed so that the generation of brake noise is prevented when the brakes are applied.

2. Description of Prior Art

When a disc brake is activated, a pair of friction pads that are attached to the brake are subject to low amplitude vibration. If this vibration is transmitted to a caliper or other components of the brake, brake noise, i.e., squeak or judder, is generated.

To prevent the occurrence of such brake noise, for example, Japanese Utility Model Post-Examination Publication No. 1-33871 (1989) discloses a technique wherein an elastic material, e.g., rubber or grease, or a special shim with a low coefficient of friction is disposed between a backing plate and a friction member, which constitute a friction pad, to prevent the generation of brake noise by the damping action provided by such an elastic material or shim.

However, the above-described prior art cannot suppress the vibration of the pad itself and is therefore inadequate to prevent brake noise.

It is known that brake noise can be reduced to some extent by chamfering the pad. However, no satisfactory clarification has yet been made as to the optimal dimension for chamfering and how the pad should be chamfered in relation to the caliper.

SUMMARY OF THE INVENTION

It is an object of the present invention to provide a disc brake wherein brake noise is effectively prevented by improving the prior art concerned with the chamfering of the pad.

To this end, the present invention provides a disc brake comprising: a pair of friction pads which are disposed at both sides, respectively, of a rotating disc, each pad comprising a central portion in the widthwise direction of the pad that is substantially coincident with the direction of rotation of the disc, and two side portions that are located at both sides of the central portion; a carrier which is attached to a nonrotating part of a vehicle and supports the friction pads slidably in the axial direction of the disc; a caliper which is supported by the carrier in such a manner as to be slidable in the axial direction of the disk; a cylinder which is formed as an integral part of the caliper, the cylinder being provided to the side of one of the pads remote from the disc and in opposing relation to the central portion of the pad, and the cylinder having a piston accommodated therein; and a pair of claws formed as integral parts of the caliper, the claws being provided to the side of the other pad remote from the disc and in opposing relation to the side portions, respectively, of the same pad. Each of the pads comprises a backing plate and a lining that is rigidly secured thereto, the lining having a friction surface that is to be pressed against the disc. Both side portions of the lining extend outwardly beyond the outer side surfaces of the corresponding claws of the caliper in the widthwise direction. And the lining is chamfered at each side portion thereof to a position whose distance from the outer side surface of the corresponding claw is in the range of from one third to one fourth of the width of the claw.

Since both side portions of each pad are chamfered as described above, the corners of the pad, which have heretofore caused fine vibration, are made obtuse so that vibration of the pad itself is unlikely to occur. In addition, each corner is disposed within the projected area of the rear side of the corresponding claw of the caliper so that the corner is effectively held from vibrating by the claw. The area of each chamfered portion is set within a range where the vibration suppressing effect of the claw is fully effective and, at the same time, the area of the friction surface of the lining required for effective braking can be ensured.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which.

DETAILED DESCRIPTION OF THE PREFERRED EMBODIMENTS

One embodiment of the disc brake according to the present invention will be described below with reference to the accompanying drawings.

Figure 1:
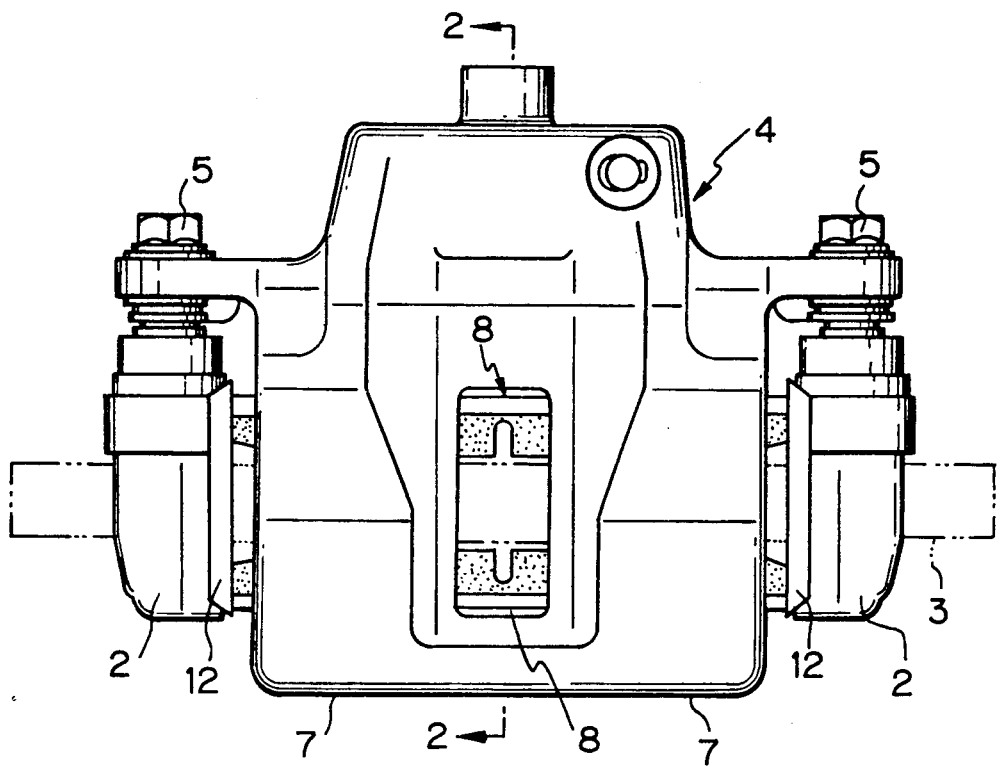
FIG. 1 is a plan view of one embodiment of the disk brake according to the present invention.
Figure 2:
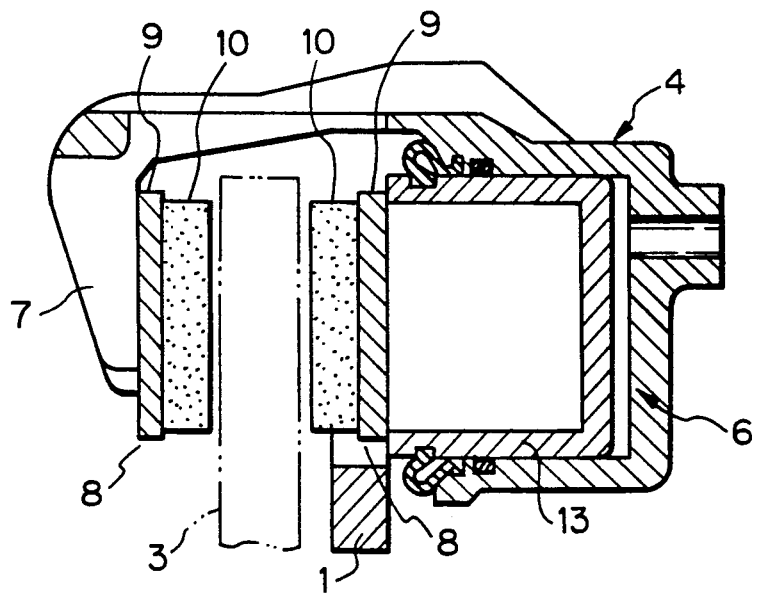
FIG. 2 is a sectional view taken along line 2—2 of FIG. 1.

Referring to FIGS. 1 and 2, the disk brake of the present invention comprises a carrier 1 that is secured to a nonrotating part of a vehicle, a pair of left and right arm portions 2 that are provided on the carrier 1, and a caliper 4 that straddles a disc 3, the caliper 4 being attached to the arm portions 2 by means of pins 5 such that the caliper 4 is movable in the axial direction of the disk 3. A pair of friction pads 8 are disposed to face both sides, respectively, of the disc 3. A cylinder 6 and a claw portion having a pair of claws 7, which are provided as integral parts of the caliper 4, are disposed to the rear of the pads 8, respectively. Each pad 8 comprises a backing plate 9 and a lining 10 which is attached thereto to serve as a friction member. The two pads 8 are formed with the same configuration and in bilateral symmetry with respect to a direction (substantially coincident with the directions of rotation of the disc 3 that are indicated by reference symbol R in FIG. 3) which is perpendicular to a direction that intersects the widthwise centers C of the pads 8, that is, the center of the disc 3 and the center of the cylinder 6. It should be noted that the two pads 8 may be formed with respective different configurations. Each pad 8 has projections 11 which are provided respectively at the left and right sides thereof. The projections 11 are received within respective grooves (not shown) formed in the two arm portions 2 of the carrier 1 through pad springs 12 (see FIG. 3). Each pad 8 is disposed such that the widthwise center line thereof is substantially coincident with an imaginary line that intersects the center of the disc 3 and the center of the cylinder 6. When hydraulic pressure is externally applied to the cylinder 6 of the caliper 4, a piston 13 in the cylinder 6 moves to press the inner pad 8 against the disc 3, and the counterforce resulting from this action causes the caliper 4 to move counter to the piston 13. In consequence, the claws 7 of the caliper 4 cause the outer pad 8 to also press against the disc 3.

Figure 3:
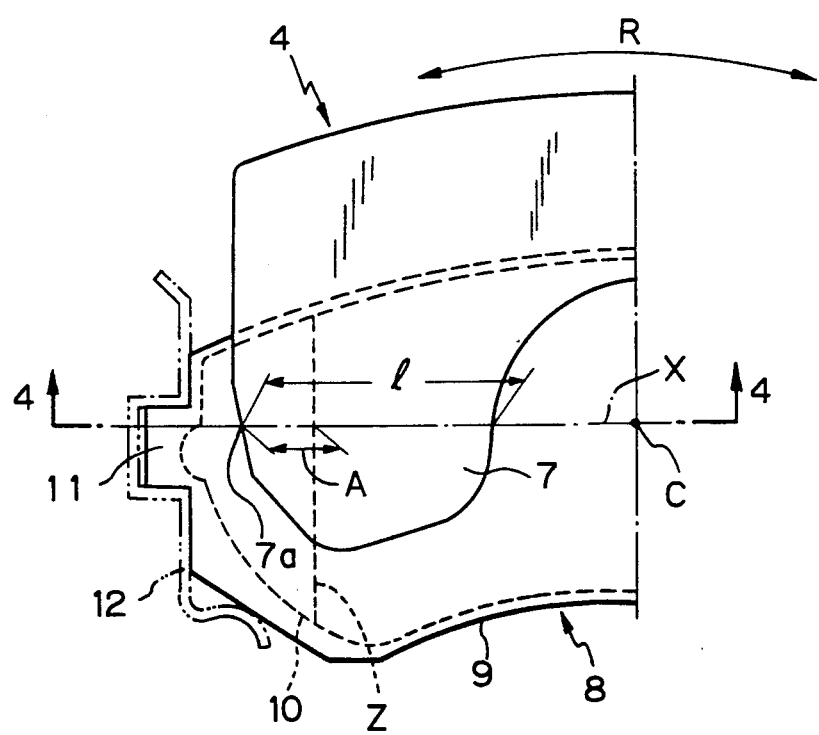
FIG. 3 is a rear view of one half of the embodiment, showing the positional relationship between a pad and a claw portion of a caliper.
Figure 4:
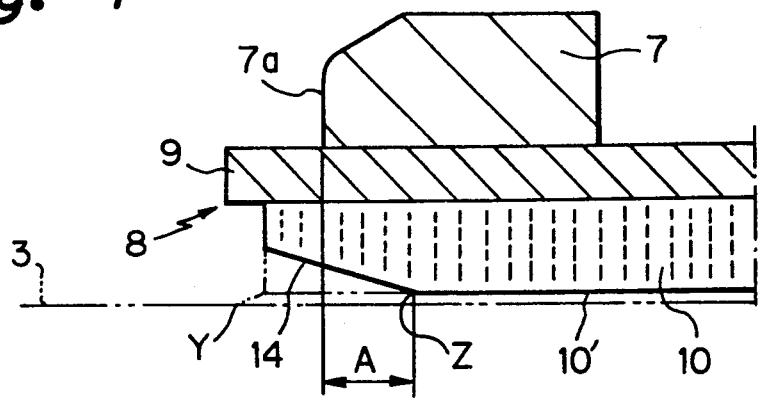
FIG. 4 is a sectional view taken along line 4—4 of FIG. 3.

Both side portions (corresponding to the ends thereof in the widthwise direction) of the lining 10 of each pad 8 extend outwardly beyond the outer side surfaces of the corresponding claws 7 of the caliper 4, and at least these side portions are chamfered to form inclined surfaces 14 (see FIG. 4). More specifically, each side portion of the lining 10 is chamfered such that the distance A between the outer side surface 7a of the corresponding claw 7 and the corner Z defined between the inclined surface 14 and the friction surface 10′ of the lining 10 as taken along an orthogonal line X that intersects perpendicularly the line intersecting the respective centers of the disc 3 and the cylinder 6 and that passes through the center position C of the pad is in the range of from one third to one fourth of the width 1 of the claw 7. It should be noted that in the example shown in FIG. 3 the corner Z that is defined between the inclined surface 14 and the friction surface 10′ extends at right angles to the orthogonal line X.

In the disk brake having the above-described arrangement, the chamfer of the lining 10 functions in relation to the claw 7 of the caliper 4 as follows. In the case of a pad that comprises a lining having no chamfer, as shown by the chain line in FIG. 4, when this lining comes into contact with the disc 3, the pad is readily caused to vibrate due to the corner Y that comes into contact with the disc 3 at an acute angle. However, since the lining 10 of the pad 8 in the present invention is chamfered so that the corner Z comes into contact with the disc 3 at an obtuse angle, fine vibration of the pad 8 itself is unlikely to occur. In addition, since the corner Z is located within the projected area of the rear surface of the claw 7 (at a position which is from $\frac{1}{3}$ 1 to $\frac{1}{4}$ 1 inward of the outer side surface 7a of the claw 7), this portion of the pad 8 is effectively held from vibrating by the claw 7 (particularly in the early stage of use when the lining 10 has become only slightly worn).

Figure 5:
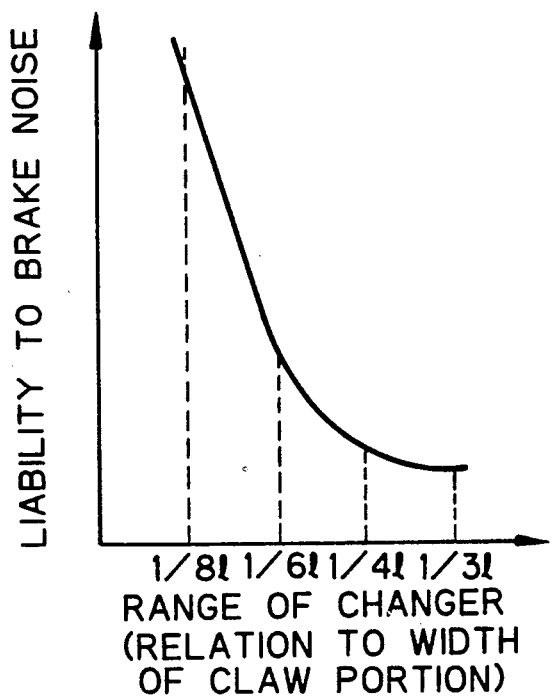
FIG. 5 is a graph showing the relationship between the range of chamfering on a lining and the liability of the pad to generate brake noise.

The area of the chamfer is set in a range where the corner Z can be effectively held by the claw portion 7 and, at the same time, any decrease in the usable area of the friction surface 10′ of the lining 10 is minimized. For instance, if a portion of the lining 10 that extends outwardly beyond the claw 7 alone is chamfered, or if chamfering is made as far as a position which is only slightly inward of the outer side surface 7a of the claw 7, the resulting corner Z cannot be held by the claw 7 at all, or it cannot be effectively held, so that no vibration suppressing effect can be expected. Even in the case where the corner Z is located within the projected area of the rear surface of the claw 7, if the above-described distance A exceeds $\frac{1}{3}$ 1, the area of the friction surface 10′ of the lining 10 descreases more than 20%, for example, so that the desired braking effect cannot be otained. Accordingly, the range of from $\frac{1}{4}$ 1 to $\frac{1}{3}$ 1 is the most suitable for the distance A. FIG. 5 is a graph showing the relationship between the chamfer range and the liability to brake noise. As will be clear from the graph, it has been confirmed that the brake noise phenomenon can be effectively prevented in the range of from $\frac{1}{4}$ 1 to $\frac{1}{3}$ 1.

Figure 6:
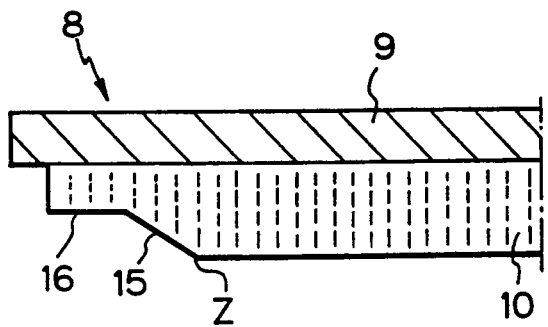
FIG. 6 is a sectional view, which is similar to FIG. 4, showing a modification of the chamfer configuration.

It should be noted that the configuration of the chamfer is not necessarily limited to the inclined surface 14 in the example shown in FIG. 4, which is straight throughout, and that it is also possible to employ a stepped chamfer structure such as that shown in FIG. 6, which consists of an inclined surface 15 defining an obtuse-angled corner Z, and a flat surface 16. Although in the foregoing embodiment the corner Z extends at right angles to the orthogonal line X, as shown in FIG. 3, it may extend at an angle to the orthogonal line X as long as the distance A along the orthogonal line X is within the range of from $\frac{1}{4}$ 1 to $\frac{1}{3}$ 1.

As will be clear from the foregoing description, the present invention effectively prevents brake noise by a synergistic effect of preventing the generation of fine vibration of the pad itself by chamfering the lining of the pad and of suppressing vibration by setting the corner of the lining within the projected area of the claw portion. The present invention also provides an optimal range of chamfering on the lining within which the vibration suppressing effect by the claw portion can be exhibited to the fullest without impairing the braking action.

Although the present invention has been described above through specific terms, it should be noted here that the described embodiment is not necessarily exclusive and that various changes and modifications may be imparted thereto without departing from the scope of the invention which is limited solely by the appended claims.

What is claimed is:

1. A disc brake comprising:
   a rotating disc having inner and outer side surfaces;
   a carrier fixedly attached to a nonrotating part of a vehicle body, said carrier straddling said rotating disc;
   inner and outer friction pads confronting the inner and outer side sufaces, respectively, of said rotating disc, said inner and outer pads being slidably supported in the axial direction of said disc by said carrier;
   a caliper slidably supported in the axial direction of said disc by said carrier, said caliper straddling said disc;
   a cylinder constituting an integral part of said caliper, said cylinder being disposed to one side of said inner friction pad remote from said disc;
   a piston slidably received in said cylinder, said piston forcing said inner friction pad onto the inner said surface of said disc when actuated; and a claw portion formed constituting an integral part of said caliper, said claw portion disposed to one side of said outer friction pad remote from said disc, and said claw portion being adapted to force the outer friction pad onto the outer side surface of said disc when said pistion is actuated;
   said outer friction pad comprising a backing plate and a lining rigidly secured to said backing plate, said lining having a friction surface facing said disc so as to be pressed against the outer side surface of said disc by said claw portion when the piston is actuated,
   said outer friction pad defining a central portion in a widthwise direction substantially coincident with directions of rotation of said disc, and two side portions extending from and located on opposite sides of said central portion such that said lining of the outer friction pad has side portions constituting the side portions of the outer friction pad;

said claw portion including a pair of claws respectively located at positions adjacent the side portions of said outer friction pad, each of said claws having terminal outer side surfaces;

both side portions of the lining of said outer pad extending outwardly beyond respective ones of said terminal outer side surfaces of the claws of said caliper in said widthwise direction;

the lining of said outer friction pad being chamfered at said side portions thereof so as to form respective inclined surfaces each intersecting said friction surface at a line defining an obtuse-angled corner between the respective inclined surface and the friction surface, such that fine vibration of said outer friction pad is prevented at the side portions thereof when said claw portion forces the outer friction pad onto the outer side surface of said disc; and each said line intersecting an imaginary line, which extends in said widthwise direction through the central longitudinal axis of said cylinder, at a position whose distance from the terminal outer side surface of the coresponding said claw is in the range of from one third to one fourth of the width of said claw as taken from the terminal outer side surface thereof along said imaginary line, such that vibration of said outer friction pad at each said corner is suppressed by said claw portion when said claw portion forces the outer friction pad onto the outer side surface of said disc.

2. A disc brake according to claim 1, wherein each of the lines defining the corners between each of said inclined surfaces and said friction surface extend substantially at right angles to said widthwise direction.

3. A disc brake according to claim 1, wherein each of the lines defining the corners between each of said inclined surfaces and said friction surface extend at an angle to said widthwise direction.

4. A disc brake according to claim 1, wherein said friction pads have identical configurations.

* * * * *